United States Patent Office 3,661,819
Patented May 9, 1972

3,661,819
AQUEOUS COATING FOR USE IN ELECTRODEPOSITIONS CONTAINING FULLY ETHERIFIED POLYMETHYLOL AMINOTRIAZINE CROSS-LINKING AGENTS
Jerry Norman Koral, Stamford, and Michael Petschel, Jr., Wilton, Conn., assignors to American Cyanamid Company, Stamford, Conn.
No Drawing. Filed Sept. 21, 1970, Ser. No. 74,107
Int. Cl. C08g 9/30
U.S. Cl. 260—21
10 Claims

ABSTRACT OF THE DISCLOSURE

An aqueous dispersion of a mixture of certain alkylated fully methylolated aminotriazines such as melamine and benzoguanamine in a mixture with certain water-dispersible, nongelled, polymeric materials carrying an anionic charge, which polymerci material contains at least one class of reactive groups selected from the group consisting of carboxyl groups, alcoholic hydroxy groups and amide groups. The invention further relates to the use of such aqueous dispersions in the electrodeposition of aqueous coatings on metallic surfaces.

BACKGROUND OF THE INVENTION

For a number of years, the methods used in painting metallic articles having irregularly shaped surfaces included hand or automatic spray painting, electrostatic painting, brushing, or dipping. Electrophoretic techniques have been applied in coating articles having a relatively small surface area, but these techniques have been restricted to the application of special coating materials. The present methods of applying a surface coating on large metallic articles have resulted in the waste of relatively large amounts of the coating due to over-spraying or due to the accumulation of excess paint material along certain surfaces of the coated articles. Additionally, these coating techniques usually result in a relatively poor surface finish to the article being coated due to uneven distribution of paint or due to blemishes. A further shortcoming of the prior methods for applying a coating onto comparatively large metal articles resides in the fact that it has been rather difficult to obtain a relatively uniform film of paint over the entire surface of the electroconductive metal article. A further shortcoming resides in the fact that certain of the surfaces were not readily accessible to the application of the coating material which results in an unsatisfactory coating. Recessed areas such as the rocker panels of automobiles have only been coated by the prior art techniques at considerable expense because of the requirements of special coating techniques or special hand labor operations in order to obtain at least a minimum measure of protection against corrosion. The technique of dipping the metallic article in a paint bath to obtain a coating on recessed surfaces of a metallic article has not proven satisfactory since the evaporation of solvents from the paint film has resulted in washing off a portion of the adhered paint coating. It is, therefore, one of the principal objects of the present invention to provide a composition of matter which can be used effectively in the coating of electroconductive metallic articles by use of an electrophoretic technique which will provide a substantially uniform coating on all surfaces being treated.

Reference is made to the article entitled "Electrodeposition: Theory and Practice," by Glover et al., in the Official Digest, February 1965, pages 113–128, inclusive. Attention is also directed to the British Pat. 933,175, which was published on Aug. 8, 1963, entitled "Improvements in an Electrophoretic Coating Process." Each of these publications is incorporated herein by reference.

FIELD OF THE INVENTION

The present invention is in the field of aqueous coating compositions comprising a blend of certain water-dispersible, nongelled polymeric materials carrying an anionic charge blended with certain cross-linking agents that are fully etherified polymethylol aminotriazines such as certain fully etherified hexamethylol melamines and certain fully etherified tetramethylol benzoguanamine.

DESCRIPTION OF THE PRIOR ART

In addition to those references referred to hereinabove in the discussion of the Background of the Invention, reference is made to the U.S. Pat. 3,471,388 which patent is incorporated herein by reference.

SUMMARY OF THE INVENTION

This invention relates to an aqueous dispersion of a mixture of from about 5% to about 40% by weight, of (A) an aminotriazine compound selected from the group consisting of

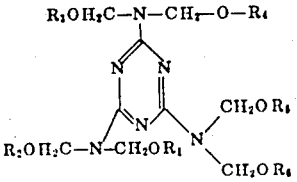

and

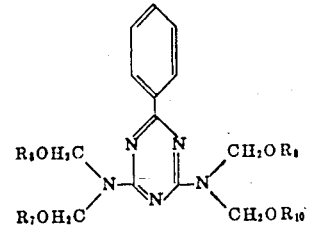

wherein $R_1$ through $R_6$ inclusive is $(A_1)_5(A_2)_1$ to $(A_1)_4(A_2)_2$ inclusive and $R_7$ through $R_{10}$ inclusive is $(A_1)_3(A_2)_1$ to $(A_1)_2(A_2)_2$ wherein $A_1$ in each instance is an alkoxy group derived from the reaction of a primary or secondary mono-hydric alcohol having a boiling point at atmospheric pressure between about 64° C. and 220° C. with a methylol group and $A_2$ is an alkoxy group derived from the reaction of a primary or secondary monohydric alcohol having a boiling point between about 140° C. and 190° C. at atmospheric pressure with a methylol group and correspondingly from about 95% to about 60% by weight, of (B) a water dispersible nongelled polymeric material carrying an anionic charge which polymeric material contains at least one class of reactive groups selected from the group consisting of carboxyl groups, alcoholic hydroxy groups and amide groups wherein the amount of said groups is at least about 3%, by weight, and not more than about 30%, by weight, based on the total weight of said polymeric material; wherein said groups are heat reactive with (A) and wherein said percentages of (A) and (B), by weight, total 100% and are based on the total weight of (A) and (B).

Still further, this invention relates to a process for electrodepositing an aqueous coating of the class just described on a metal substrate in which the metal is immersed in the aqueous dispersion of the present invention and then the aqueous dispersion is subjected to electrophoresis in order to deposit the mixture of (A) and (B) on the metal as an adherent film.

The component (A) is a mixture of substantially water-insoluble, substantially fully etherified polymethylol aminothriazines selected from the group consisting of melamine and benzoguanamine. These aminotriazines should be substantially fully methylolated by having been reacted with formaldehyde in a sufficient amount so as to fully methylolate the triazines. In the case of melamine, the compound will be substantially hexamethylol melamine whereas in the benzoguanamine, it will be substantially tetramethylol benzoguanamine. These etherified methylol aminotriazines are not considered to be resinous materials since they are, as individual entities, substantially pure compounds, but they are potential resin forming compounds which enter into chemical reaction with certain ionic water-dispersible, nongelled polymeric materials when subjected to heat and particularly when subjected to heat under acidic conditions. The concept of the degree of alkylation on the average will be discussed hereinbelow in order that this concept may be fully understood.

Theoretically, it is possible to methylolate melamine fully, that is, to produce hexamethylol melamine. However, frequently a composition purporting to be hexamethylol melamine, when analyzed shows a fractional degree of methylolation. It is well recognized that fractional methylolation is not considered to be possible. As a consequence, when a composition containing an analysis of a degree of methylolation of 5.75, 5.80 or even 5.90, it has to be recognized that this is but an average degree of the methylolation of the melamine compound and establishes logically that the aforementioned methylol composition is composed of a mixture of a preponderant amount of hexamethylol melamine with comparatively minor amounts of pentamethylol melamine and perhaps insignificant amounts including traces of such derivatives as tetramethylol melamine and even trimethylol melamine. By the same token, it is possible to methylolate benzoguanamine fully, that is to produce tetramethylol benzoguanamine. However, a composition purporting to be tetramethylol benzoguanamine when analyzed will probably show a fractional degree of methylolation, such as 3.75, 3.80 or even 3.90 degree of methylolation. As in the case of the melamine compounds, this mixture of tetramethylol benzoguanamines will contain a preponderant amount of tetramethylol benzoguanamine and a minor amount of trimethylol benzoguanamine and even lesser quantities of dimethylol benzoguanamine. The same concept of averages is also applicable to the alkylation or etherification of these polymethylol aminotriazine compositions. As before, there cannot be, based on previous reasoning, a fractional alkylation and as a consequence, when on analysis a given composition shows that the degree of alkylation from one given alcohol is 2.5 and the degree of alkylation from a different alcohol is correspondingly either 3.5 or 1.5 depending on the particular aminotriazine selected, it must be concluded that there is present in such compositions, some mixed fully alkylated, fully methylolated aminotriazines. It is believed, however, that these mixtures of compounds do contain some slightly condensed derivatives such as dimers and trimers. These aminotriazine compounds used as the cross-linking agent in the compositions of the present invention may be described as having the formulas $MF_6(A_1)_5(A_2)_1$ to $MF_6(A_1)_4(A_2)_2$ or $$BF_4(A_1)_3(A_2)_1$$

to $BF_4(A_1)_2(A_2)_2$ in which M represents melamine, F represents formaldehyde and the subdigit behind the formaldehyde represents the number of folds and B represents benzoguanamine. In the parenthetical expressions $A_1$ is an alkoxy group derived from the reaction of a primary or secondary monohydric alcohol having a boiling point between 64° C. and 220° C. with a methylol group on either melamine or benzoguanamine and wherein $A_2$ is an alkoxy group derived from the reaction of a primary or secondary monohydric alcohol having a boiling point between 140° C. and 190° C. with a methylol group attached to melamine or benzoguanamine.

Among those primary or secondary monohydric alcohols which may be used to provide the alkoxy group $A_1$ are methanol, isopropanol, n-propanol, butanol, 2-butanol, iso-butanol, 1-pentanol, 2-methyl-1-butanol, 3-methyl-1-butanol, 2-methoxy ethanol, 2-ethoxy ethanol, 2-butoxy ethanol, 2-isobutoxy ethanol, 1-hexanol, 2-methylpentanol, 4-methyl-2-pentanol, 2-ethylbutanol, 2-ethylhexanol, iso-octanol, 2,6-dimethyl-4-heptanol, iso-decanol, 2-hexoxy-ethanol, cyclohexanol and the like. These alcohols may be used either singly or in combination with one another and in the latter instance, it could be that there would be as many as 4 to 6 different alkoxy groups derived from the reaction of 4 to 6 different primary or secondary alcohols having a boiling point between about 64° C. and 220° C. with a methylol group.

Among the alcohols that may be used to alkylate the methylol groups of hexamethylol melamine or tetramethylol benzoguanamine to give the $A_2$ alkoxy group are 2-isobutoxyethanol, 1-hexanol, 2-methylpentanol, 2-ethylbutanol, 2-ethylhexanol, iso-octanol, 2,6-dimethyl-4-heptanol and cyclohexanol. As before in the discussion of the $A_1$ type of alkoxy derivative, these alcohols may be used either singly or in combination with one another. It should be noticed that the boiling point range of the $A_2$ alcohols is narrower but within the range of the $A_1$ alcohols and as a consequence, it can be seen that if desired the hexamethylol melamine and the tetramethylol benzoguanamine may be alkylated exclusively with the alcohols of the $A_2$ group which would give such a product as hexa hexylated hexamethylol melamine or tetrahexylated tetramethylol benzoguanamine and the like.

The amount of the mixture of substantially water-insoluble substantially fully etherified hexamethylol melamines or tetramethylol benzoguanamines used in the composition of the present invention will vary between about 5% and about 40% by weight based on the total weight of said etherified triazine derivatives and the anionic water dispersible nongelled polymeric material which is heat reactive with said triazine compounds mixture. Correspondingly, in the composition there will be from about 95% to about 60% by weight, of the ionic water dispersible nongelled polymeric material which is heat reactive with said etherified triazine based on the total weight of said anionic polymeric material and said mixture of the triazines. It should be apparent that all of the above percentages, by weight, will total 100%, by weight, and are based on the total solids weight of the triazine compounds and said anionic polymeric material. It is preferred to use between about 15% and about 25%, by weight, of the triazine compounds and correspondingly from about 85% and 75%, by weight, of the said anionic polymeric material, same basis.

The process for making a representative mixture of substantially water-insoluble, substantially fully etherified hexamethylol melamine compounds is set forth hereinbelow. This example is set forth primarily for the purpose of illustration and no specific enumeration of detail contained therein should be interpreted as a limitation of the claims, except as is indicated in the appended claim. All parts are parts by weight unless otherwise indicated.

PREPARATION OF CROSS-LINKING AGENT A

Into a suitable reaction vessel equipped with a thermometer, stirrer and condenser, there is introduced 390 parts of hexamethoxy methyl melamine and 715 parts of 1-hexanol. The charge is heated to 30° C. whereupon there is aded 30 parts of 70% nitric acid. After constant stirring, the pH is checked after about 5 minutes and it is below 2.5. After a holding period of 30 minutes at 30–35° C. a vacuum of 70–80 millimeters of mercury is applied to the system and the free methanol released in the course of the transetherification reaction is distilled off. The temperature is increased over a 3 hour period to 65° C. and held at that temperature until 200 parts of the distillate are collected. There is then added 28 parts of 50% solution of sodium hydroxide and the pH is checked again and it is about 9–10. The vacuum stripping is continued and the temperature is increased to 100° C. and held at that temperature for about 2 hours. The finished material is essentially hexa(hexoxymethyl)melamine.

CROSS-LINKING AGENT B

Cross-linking Agent A example is repeated in all essential details except that in the place of the 1-hexanol there was introduced 910 parts of 2-ethylhexanol. Additionally, the amount of nitric acid was increased to 40 parts and the sodium hydroxide solution was increased to 45 parts. The finished material is essentially hexa(2-ethyl hexoxymethyl)melamine.

CROSS-LINKING AGENT C

The procedure for cross-linking Agent A is repeated in all essential details except that in the place of the 715 parts of 1-hexanol, there is substituted 316 parts of isodecanol. The amount of nitric acid used was 20 parts and the amount of sodium hydroxide solution was 18. Only 70 parts of methanol are removed during the vacuum distillation.

CROSS-LINKING AGENT D

Into a suitable reaction vessel equipped as in the preparation of cross-linking Agent A, there is introduced 420 parts of tetra(ethoxymethyl)benzoguanamine and 255 parts of 1-hexanol. The procedure of the first example is repeated in all essential details except that there was used 20 parts of the 70% nitric acid and 18 parts of the 50% sodium hydroxide solution. 95 parts of ethyl alcohol are removed during the vacuum distillation and the finished product has an average composition very close to di(ethoxymethyl)di(hexoxymethyl)benzoguanamine.

The second component in the compositions of the present invention is water dispersible nongelled polymeric material carrying an anionic charge.

It is deemed advisable to engage in a discussion of these anionic water dispersible nongelled polymeric materials. It should be observed that it is not sufficient for the anionic water dispersible nongelled polymeric material to be anionic. This nongelled polymeric material must in addition to the aforementioned charge characteristic, also contain one of more reactive sites selected from the group consisting of carboxyl groups, alcoholic hydroxy groups or amido groups in order to cross-link with the aminotriazine compounds used in the present invention. If the nongelled polymeric material contains carboxyl groups, it will be anionic, and will inherently be carrying with it the cross-linking sites for the aminotriazine compound. On the other hand, if the nongelled polymeric material is devoid of any carboxyl groups, but does contain alcoholic hydroxy groups and/or amido groups, said polymeric material will be nonionic but can be converted to an anionic material by carboxylating the polymeric material or by dispersing said polymeric material in water with an anionic surfactant. By the same token, if a nongelled water dispersible polymeric material devoid of any carboxyl groups but containing alcoholic hydroxyl groups and/or amido groups were to be prepared, such material again, as before, would contain the necessary cross-linking sites but would, nevertheless, be a nonionic polymeric material. The purpose for having the electric charge on the water dispersible non-gelled polymeric material is so that it will migrate to the anode in an electric phoretic system if an anionic material is present. It will be apparent from the illustrative examples of the present invention that these charged polymeric materials move to the anode along with the aminotriazine compounds and become deposited thereon. After the deposition of the mixed polymeric material has been accomplished on the electroconductive metal, the coated metal is then heat treated, preferably by baking, in order to accomplish the cross-linking between the aminotriazine compounds and the polymeric material containing the cross-linking sites that are heat reactive with the aminotriazine compounds. As used in an electrodeposition process, the bath of the aqueous compositions of the present invention should have a pH varying between about 4 and 11 and, preferably, between about 7 and 9. Hereinbelow, there is set forth a further discussion of these polymeric materials, namely, the anionic water dispersible nongelled polymeric materials which are heat reactive with the aminotriazine compounds.

The anionic water dispersible nongelled polymeric material used in the composition of the present invention may be any one of a plurality of polymeric materials which have reactive sites that are heat reactive with the etherified aminotriazine compounds. These reactive sites may be carboxyl groups and/or alcoholic hydroxyl groups and/or amido groups, which polymeric materials are the result of vinyl polymerization, epoxy polymerization, polyester compositions, or maleinized oils. These polymeric materials may be completely water soluble or they may be substantially water insoluble but which are capable of being dispersed in water. Sometimes it may be necessary to use appropriate surfactants to disperse these polymeric materials. The term "water dispersible," therefore, is intended to encompass both the aqueous solutions as well as dispersions in which the polymeric material is suspended in the aqueous medium. These anionic polymeric materials may contain, as the sole reactive sites, carboxyl groups or alcoholic hydroxyl groups, or amide groups, or they may, in fact, contain all three.

When the polyester resins are used, they are prepared by reacting a polycarboxylic acid including dicarboxylic acids with a polyhydric alcohol, including the glycols. The polycarboxylic acids may be either saturated, i.e., free of nonbenzenoid unsaturation, or they may be $\alpha,\beta$-ethylenically unsaturated.

If the polyester resins as used contain preponderant amounts of the polycarboxylic acid, such polyester should be reacted until an acid number of not less than about 35–40 is reached and, preferably, to an acid number of between about 50–150. If the polyester resin is prepared by using a preponderance of alcoholic hydroxyl groups, the ingredients forming the polyester are permitted to react until a hydroxyl number of not less than about 35–40 is reached and, preferably, between about 50 and 150.

When these anionic polymeric materials are prepared and dispersed in water, they may be rendered alkaline by adjusting the pH to a point above 4 to about 11 and, preferably, to a pH above about 7.1 to about 9. This adjustment of the pH is accomplished on the anionic polymeric material before the etherified hexamethylol melamine compounds are added and then, if necessary, the pH is readjusted to a point within the ranges set forth hereinabove.

The maleinized oils are water soluble or water dispersible and are prepared by reacting unsaturated glyceride oils with an acid or anhydride dienophile such as maleic anhydride. Other acids or anhydride dienophiles have also been used and these include acrylic acid, crotonic acid, and the like. These water solubilized oils were discussed by J. J. Hopwood at the Sixth Australian Convention, Warburton, 16–19, July 1964, and a paper has been published entitled "Water Soluble Thermosetting Organic Polymers" in the Journal of the Oil and Colour Chemists Association, February 1965, pages 157–171, inclusive, which reference is incorporated herein by reference.

All of these anionic water dispersible nongelled polymeric materials having carboxyl groups and/or alcoholic hydroxyl groups and/or amide groups have water sensitive sites obviously, by virtue of the presence of these groups, and these water sensitive sites should all be tied up by interreaction with the etherified aminotriazine compounds, in a cross-linking mechanism. Before the cross-linking takes place, the aminotriazine compounds also function as plasticizers for the total composition.

The anionic polymeric materials prepared by vinyl polymerization, may be prepared in either an aqueous solution, an organic solvent, or in an aqueous emulsion system, all of which procedures are thoroughly well known in the art, and it is not deemed necessary to elaborate on such procedures here.

The vinyl polymers may be prepared by polymerizing polymerizable monomers such as acrylic acid, methacrylic acid, crotonic acid, cinnamic acid, $\beta$-benzoyl acrylic acid, and polycarboxylic acids of the $\alpha,\beta$-ethylenically unsaturated class such as maleic, fumaric, itaconic, mesaconic, ataconic, and the halogenated acids such as halogenated maleic or, more specifically, chloromaleic acid, and the like. These acidic materials may be copolymerized or polymerized with other monomers which contain no carboxyl groups such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate, and the like. Still further, one could use such polymerizable compounds as styrene, ortho-, meta- or para-alkyl styrenes such as the o-, m- or p-methyl, ethyl, propyl and butyl styrenes, 2,4-dimethyl styrene, 2,3-dimethyl styrene, 2,5-dimethyl styrene, vinyl naphthenate, acrylonitrile, methacrylonitrile, halo ring or side chain styrenes such as $\alpha$-chloro styrene, ortho-, meta- or para-chlorostyrenes, 2,4-dichlorostyrene, 2,3-dichlorostyrene, 2,5-dichlorostyrene or the alkyl side chain styrenes such as $\alpha$-methyl styrene, $\alpha$-ethyl styrene, and the like. Additionally, one can make use of such polymerizable vinyl monomers as acrylamide, methacrylamide, ethacrylamide, ethylene-bisacrylamide, N-tertiarybutylacrylamide, and the like.

The anionic polymeric materials containing alcoholic hydroxyl groups are prepared by using a polymerizable vinyl monomer which contains an alcoholic hydroxyl and is to be found in such compounds as the hydroxyalkyl esters of $\alpha,\beta$-unsaturated monocarboxylic acids, such as the hydroxy alkyl esters of acrylic acid, methacrylic ethacrylic and chloro as well as the other halo substituted acrylic acids. These esters may either have a primary or a secondary hydroxyl group. Illustrative of the types of compounds that are used to make the copolymers in the anionic, polymeric material are 2-hydroxyethyl acrylate, 2-hydroxypropyl acrylate, 3-hydroxypropyl acrylate, 2-hydroxybutyl acrylate, 3-hydroxybutyl acrylate, 4-hydroxybutyl acrylate, 8-hydroxyoctyl acrylate, 2-hydroxyethyl methacrylate, 5-hydroxyhexylmethacrylate, 6-hydroxyoctylmethacrylate, 8-hydroxyoctylmethacrylate, 10-hydroxydecylmethacrylate, 3-hydroxypropyl crotonate, 4-hydroxyamyl crotonate, 5-hydroxyamyl crotonate, 6-hydroxyhexyl crotonate, 7-hydroxyheptyl crotonate, 10-hydroxydecyl crotonate, and the like. These hydroxy esters may be used either singly or in combination with one another with other polymerizable vinyl monomers devoid of any alcoholic hydroxyl group including those set forth hereinabove in the discussion of the carboxyl group-containing monomers. Additionally, one can make use of other hydroxyl-containing polymerizable vinyl monomers such as methylolacrylamide, methylolmethacrylamide, and the like.

Among the amide group-containing monomers which may be used in the preparation of the anionic, water dispersible, polymeric material used in the present invention are acrylamide, methacrylamide, ethacrylamide, and the like. These polymerizable acrylamides may be used to prepare anionic polymeric materials used in the present invention with any of the carboxyl group-containing monomers or the hydroxyl group-containing monomers or with any of the polymerizable monomers set forth hereinabove.

Additionally, one can make use of polyester resin compositions which are water dispersible nongelled anionic polymeric materials. Water soluble alkyd resins or water dispersible alkyd resins, whether oil free or glyceride oil-containing may be used and a plurality of these materials are commercially available and are also well known in the art and, as a consequence, it is not deemed necessary to make any prolonged recitation of snch materials since they are fundamentally prepared by reacting a polyhydric alcohol with a polycarboxylic acid or with anhydrides such as phthalic anhydride, maleic anhydride, and the like.

Additionally, one can make use of epoxy esters as the anionic polymeric material in which the epoxy resins, which contain a plurality of hydroxyl groups are reacted with glyceride oil fatty acids and then further reacted with maleic anhydride to yield a dispersion in an alkaline medium. Still further, one can make use of polyamides which are prepared by reacting alkylene polyamines with excess dicarboxylic acids to produce water soluble and water dispersible anionic polymeric materials.

A veriety of emulsion anionic polymers may be used in the composition of the present invention, wherein the utilization of a variety of anionic surfactants or emulsifiers such as soaps and alkyl sulfonates are used to impart a charge characteristic to the emulsion particles which will result in the migration of such particles in electric fields. These same surfactants and in combination with a variety of nonionic surfactants can be used to post-emulsify a variety of epoxy esters, saturated and unsaturated alkyd resins and acrylic resins to prepare charged emulsion particles.

In order to illustrate the preparation of an anionic carboxyl group-containing polymer, the following example is set forth in which all parts are parts by weight, unless otherwise indicated.

POLYMER I

Into a suitable reaction vessel equipped with stirrer, thermometer and reflux condenser, there is introduced 100 parts of dioxane. The charge is heated gradually to the reflux temperature by heating in an oil bath. After the dioxane has reached reflux, a mixture of 750 parts of butyl acrylate, 150 parts of acrylic acid and 100 parts of a 1% solution of butyl mercaptan in butyl acrylate are introduced in relatively small increments over a 2 hour period. Concurrently but separately, over the same period of time, there is added 12.2 parts of cumene hydroperoxide. After the addition is completed, reflux is continued for about 5 hours. 200 parts of the copolymer thus prepared are dissolved in 220 parts of a mixture of 1 part of concentrated ammonia (29% $NH_3$) to 4 parts of water. An additional 80 parts of water is added to give an aqueous solution of 36% solids concentration of the copolymer. The solvent dioxane is used in the present example in an amount approximately 10% of the total charge. At the end of the polymerization reaction, this solvent may be stripped off under vacuum but it is preferred to leave said solvent in since its removal is not economically justifiable and since this solvent is completely water miscible.

POLYMER II

Into a suitable reaction vessel, equipped with thermometer, stirrer, reflux condenser, a nitrogen inlet tube and a dropping funnel there is introduced 50 parts of the hexyl ether of ethylene glycol, 275 parts of butyl acrylate, 150 parts of styrene, 75 parts of acrylic acid, 10 parts of ditertiary butyl peroxide, 10 parts of dodecyl mercaptan, in the order indicated hereinbelow. The hexyl ether of ethylene glycol is charged into the reaction vessel first and is heated to 150° C. and nitrogen is blown over the solvent so as to provide a blanket. There is then added the blend of the butyl acrylate, styrene, acrylic acid, peroxide and mercaptan through the dropping funnel. The monomer mixture is fed into the reaction vessel at the rate of about 4 parts per minute after the solvent reaches 150° C. After two or three minutes the polymerization begins. The incremental addition of the catalyzed monomer mixture is continued into the reaction vessel and the temperature is maintained between about 140° C. and 150° C. After all of the catalyzed monomer is fed into the reaction vessel, the reaction mixture is held for two hours at 140–150° C. in order to assure complete conversion of all monomer. The reaction mixture is then cooled to about 110–115° C. and further diluted with 80 parts of the methyl ether of ethylene glycol. During the whole feeding period the reaction temperature is held at 140–150° C.

POLYMER III

Into a suitable reaction vessel equipped with a thermometer, stirrer, condenser, and two additional funnels, there is added 440 parts of deionized water, 3.4 parts of sodium bicarbonate, and 2.0 parts of sodium lauryl sulfate. The mixture is heated to about 90° C. whereupon a catalyst solution containing 2.25 parts of ammonium persulfate dissolved in 110 parts of deionized water is prepared and 12 parts of this solution are added to the reaction vessel. This is followed by the addition of 90 parts of said catalyst solution uniformly over a two hour period in comparatively small increments to the reaction vessel. Concurrently, but separately, a monomer mixture of 170 parts of styrene, 235.6 parts of ethyl acrylate, 4.5 parts of acrylic acid and 32 parts of hydroxyethyl methacrylate is added uniformly over the same two hour period through a separate funnel. The remainder of the catalyst solution is then added to the reaction vessel and the mixture is heated at 90° C. for an additional one hour period. The reaction mixture thus prepared was analyzed and was shown to have a polymer solids of 48%.

POLYMER IV

Into a suitable reaction vessel equipped with thermometer, nitrogen inlet and outlet tubes, stirrer and reflux condenser, there is introduced 41 parts of ethyl 2-ethoxy ethanol and the solvent is heated to about 140° C. using a nitrogen blanket. Separately there is prepared a mixture of the following monomers: 21.16 parts of butylacrylate, 17.83 parts of acrylonitrile, 0.13 part of sulfo-ethyl methacrylate, 0.08 part of tri-ethyl amine, 10.75 parts of hydroxyethyl methacrylate, 7.13 parts of acrylic acid, 0.66 part of 2,5-dimethyl-2,5-di(t-butyl peroxy)hexane. These monomers are mixed with continuous stirring and when the ethyl 2-ethoxy ethanol in the reaction vessel has been refluxing for at least 10 minutes, the monomer mixture addition is started. The monomer addition takes about 6 hours since they are added in small increments. During the addition of the monomeric mixture, the temperature in the kettle will drop but the control should be left as set for the initial reflux. When the monomer addition is complete, the reaction is held for about 3 hours during which time the kettle temperature of 135–138° C. will again be reached. The resin can then be cooled to 70–75° C. and drained. The polymeric material has a viscosity of Z4-Z6 on the Gardner Holdt scale at 25° C. and has a solids content of 59% ±2%. The acid number is about 55–75 and the Gardner color is a maximum of 15.

POLYMER V

Into a suitable reaction vessel equipped with a thermometer, stirrer, condenser, and two additional funnels, there is introduced 348 parts of deionized water, 1.85 parts of sodium lauryl sulfate, and 4.08 parts of sodium bicarbonate. The reaction mixture is heated to 90° C. whereupon a catalyst solution containing 2.7 parts of ammonium persulfate in 115 parts of deionized water is prepared and 12 parts of this catalyst solution is introduced into the reaction vessel. Thereupon, 90 parts of said catalyst solution is added uniformly in comparatively small increments over a 2 hour period to the reaction vessel. Concurrently during said 2 hour period, but separately, there is added a monomer mixture of 212 parts of styrene, 293 parts of ethyl acrylate, 5.3 parts of acrylic acid, 21 parts of acrylamide, 0.75 part of sodium lauryl sulfate and 348 parts of deionized water over this same two hour period. The remainder of the catalyst solution is then dded to the reaction vessel and the mixture is heated at 90° C. for an additional one hour period. The reaction mixture thus prepared was analyzed and revealed a polymer solids of 37.6%.

In order that the concept of the present invention may be more completely understood, the following examples, illustrative of the present invention are set forth. These examples are for illustration purposes only and any significant enumeration contained therein should not be interpreted as a limitation on the invention, except as indicated in the appended claims.

EXAMPLE 1

100 parts of a 70% solution of a butylacrylate-styrene-acrylic acid terpolymer as prepared according to polymer II, is blended with 30 parts of the cross-linking agent A. To this blend, 3.5 parts of diethylamine are added. The total mixture is emulsified in 870 parts of deionized water. After an aging time of 16 hours at room temperature, the emulsion is placed into a glass tank. A stainless steel electrode is used as the cathode. The anode is a bare steel panel. At a deposition condition of 200 volts for 1 minute, a heavy film is deposited. This film is rinsed with deionized water and baked for 10 minutes at 200° C. The resulting film has a film thickness of 2.5 mil. It is very uniform and does not have any blisters. The Knoop hardness is 3.2 and the impact resistance above 160 in./lbs.

COMPARATIVE EXAMPLE 2

The composition of Example 1 is repeated in all essential details except that the cross-linking agent is a hexa-(ethoxymethyl)melamine. With this cross-linking agent it is not possible to deposit a film thicker than 1.5 mil and the film thickness above 1.5 mil has blisters and pin holes. The reverse impact resistance of the coating is about 80 in./lbs. and has a Knoop hardness of 5.0.

EXAMPLE 3

100 parts of 70% solution of polymer II is blended with 20 parts of the cross-linking agent B. After the addition of the diethylamine and the water, the bath is aged for about 16 hours. Films electrodeposited from this solution, had a thickness of about 3.5 mil and no blisters. The impact resistance of the coating was above 160 in./lbs.

EXAMPLE 4

100 parts of the 70% solution of the pentapolymer of a butyl acrylate, styrene, acrylic acid, 2-hydroxy-ethyl acrylate and 2-sulfo-ethyl methacrylate (polymer IV) as prepared hereinabove is blended with 30 parts of the cross-linking agent C. To this blend there is added 5.0 parts of triethylamine and 40 parts of titanium dioxide and the mass is ground on a three roll mill. The paste is emulsified with 820 parts of deionized water.

A film of 0.9 mil is electrodeposited on steel substrates pretreated with Bonderite No. 801. After a baking cycle of 20 minutes at 150° C., the film has a Knoop hardness of 5.0. The impact resistance is 40 in./lbs. When the cross-linking agent as used hereinabove is replaced by a comparable quantity of hexa(ethoxymethyl)melamine, the impact resistance is reduced to 5 in./lbs.

CROSS-LINKING AGENT E

Into a suitable reaction vessel equipped as before, there is introduced 3510 parts of hexa(methoxymethyl)melamine, 5508 parts of 1-hexanol and 60 parts of maleic anhydride. After being charged into the reactor, the mass is heated and methanol is split off and collected as the major fraction of the distillate. After 5 hours, 1750 parts of distillate had been collected and the solids content of the reactor had reached 80.4%. Theoretically, 4.1 moles of hexanol had been combined. Vacuum stripping brought the final solids to 89%.

EXAMPLE 5

100 parts of a 70% solution of polymer II is blended with 30 parts of cross-linking agent E and 3.6 parts of diethylamine. The blend is emulsified in 870 parts of deionized water. The paint is electrodeposited at 200 volts for 1 minute on a steel substrate. After blowing off the excess bath liquid the film is baked at 200° C. for 5 minutes. The film, with a thickness of 2.8 mils is blister free. The film has an impact resistance over 160 in./lbs.

The blend of the component (A), namely the cross-linking agent, and (B), namely the water dispersible nongelled polymeric material carrying an anionic charge are emulsified in the presence of an organic amine or an inorganic base in deionized water. If a clear coating composition is desired, no pigment need be added, however, if a colored coating is preferred, appropriate organic or inorganic pigments and or dyes may be added. These coating compositions can be electrodeposited by utilizing a potential difference of 20-500 volts for a period of time varying between about 5 seconds and 5 minutes. The film thickness deposited can vary between about 0.1 mil to 5 mil. The electrodeposited film is baked at a temperature varying between about 120° C. and 300° C.

What is claimed is:

1. An aqueous dispersion of a mixture of from about 5% to about 40% by weight, of (A) an aminotriazine compound selected from the group consisting of

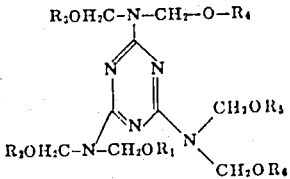

and

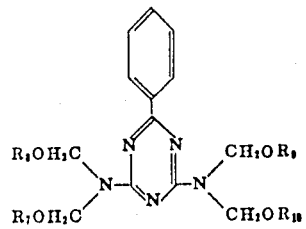

wherein $R_1$ through $R_6$ inclusive is $(A_1)_5(A_2)_1$ to $(A_1)_4(A_2)_2$ inclusive and $R_7$ through $R_{10}$ inclusive is $(A_1)_3(A_2)_1$ to $(A_1)_2(A_2)_2$ wherein $A_1$ in each instance is an alkoxy group derived from the reaction of a primary or secondary mono-hydric alcohol having a boiling point at atmospheric pressure between about 64° C. and 220° C. with a methylol group and $A_2$ is an alkoxy group derived from the reaction of a primary or secondary mono-hydric alcohol having a boiling point between about 140° C. and 190° C. at atmospheric pressure with a methylol group and correspondingly from about 95% to about 60% by weight, of (B) a water dispersible nongelled polymeric material carrying an anionic charge which polymeric material contains at least one class of reactive groups selected from the group consisting of carboxyl groups, alcoholic hydroxy groups and amide groups wherein the amount of said groups is at least about 4%, by weight, and not more than about 30%, by weight, based on the total weight of said polymeric material; wherein said groups are heat reactive with (A) and wherein said percentages of (A) and (B), by weight, total 100% and are based on the total solids weight of (A) and (B).

2. The aqueous dispersion of claim 1 in which $A_1$ is derived from 1-hexanol and the aminotriazine compound is a melamine derivative.

3. The aqueous dispersion of claim 1 in which $A_1$ is derived from 2-ethyl hexanol and the aminotriazine compound is a melamine derivative.

4. The aqueous dispersion of claim 1 in which the $A_1$ is derived from isodecanol and the aminotriazine compound is a melamine derivative.

5. The aqueous dispersion of claim 1 in which $A_1$ is derived from 1-hexanol and the aminotriazine compound is a benzoguanamine.

6. The aqueous dispersion according to claim 2 in which said aqueous dispersion is alkaline and in which the water-dispersible, nongelled polymeric material carries an anionic charge.

7. The aqueous dispersion according to claim 3 in which said aqueous dispersion is alkaline and in which the water-dispersible, nongelled polymeric material carries an anionic charge.

8. The aqueous dispersion according to claim 4 in which said aqueous dispersion is alkaline and in which the water-dispersible, nongelled polymeric material carries an anionic charge.

9. The aqueous dispersion according to claim 5 in which said aqueous dispersion is alkaline and in which the water-dispersible, nongelled polymeric material carries an anionic charge.

10. The aqueous dispersion according to claim 1 in which the aminotriazine compound is hexa-hexylated, hexamethylol melamine.

References Cited

UNITED STATES PATENTS 3,471,388  10/1969  Koral _____ 204—181
3,378,477  4/1968  Gentles et al. _____ 204—181

DONALD E. CZAJA, Primary Examiner
E. C. RZUCIDLO, Assistant Examiner

U.S. Cl. X.R.

204—181; 260—18 R, 29.2 R, 29.6 MN, 249.6

UNITED STATES PATENT OFFICE
CERTIFICATE OF CORRECTION

Patent No. 3,661,819　　　　Dated May 9, 1972

Inventor(s) JERRY NORMAN KORAL and MICHAEL PETSCHEL, JR.

It is certified that error appears in the above-identified patent and that said Letters Patent are hereby corrected as shown below:

Column 1, line 20, please change the word "polymerci" to read --polymeric--.

Column 3, lines 4 and 5, the word "aminothriazines" should read --aminotriazines--.

Column 5, line 46, please insert the word --a-- between the words "is" and "water."

Column 5, line 55, please change the word "hydroxy" to read --hydroxyl--.

Column 7, line 49, please insert a comma (,) after the word "methacrylic."

Column 7, line 73, please change "diss" to read -- dis- --.

Column 8, line 13, please change "snch" to read --such--.

Column 8, line 26, the word "veriety" should read --variety--.

Column 10, line 10, please change "dded" to read --added--.

Signed and sealed this 19th day of September 1972.

(SEAL)
Attest:

EDWARD M. FLETCHER, JR.
Attesting Officer

ROBERT GOTTSCHALK
Commissioner of Patents